(12) United States Patent
Odaka (10) Patent No.: US 6,939,069 B2
(45) Date of Patent: Sep. 6, 2005

(54) COMPOSITE WRITING UTENSIL

(75) Inventor: Tadao Odaka, Kawagoe (JP)

(73) Assignee: Kotobuki & Co., Ltd., Kyoto (JP)

( * ) Notice: Subject to any disclaimer, the term of this patent is extended or adjusted under 35 U.S.C. 154(b) by 0 days.

(21) Appl. No.: 10/862,380

(22) Filed: Jun. 8, 2004

(65) Prior Publication Data

US 2005/0100387 A1 May 12, 2005

(30) Foreign Application Priority Data

Nov. 12, 2003 (JP) ........................................ 2003-383088
Jan. 22, 2004 (JP) ........................................ 2004-014798

(51) Int. Cl.[7] ............................................. B43K 27/00
(52) U.S. Cl. ............................. 401/33; 401/30; 401/31
(58) Field of Search ............................. 401/29–33, 109

(56) References Cited

U.S. PATENT DOCUMENTS 4,268,183 A * 5/1981 Sekiguchi .................... 401/30
4,283,151 A * 8/1981 Sekiguchi .................... 401/33
5,056,947 A * 10/1991 Kubota et al. ................ 401/29
5,306,085 A * 4/1994 Kobayashi .................... 401/29
5,642,953 A * 7/1997 Kobayashi et al. ........... 401/30
5,890,825 A * 4/1999 Kageyama et al. ........... 401/52

\* cited by examiner

*Primary Examiner*—Justine R. Yu
*Assistant Examiner*—Huyen Le
(74) *Attorney, Agent, or Firm*—McGinn & Gibb, PLLC (57) ABSTRACT

A composite writing utensil comprising a front barrel and a rear barrel, a cam body provided within the barrel unrotatable with respect to the rear barrel, and a slider unrotatable with respect to the front barrel and coupled to each of a plurality of writing shafts. The cam body includes a V-shaped cam projection projecting forward, a cam surface, and a restraining portion. The slider comprises a V-shaped cam projecting rearward, and a slidably-contacted surface extending along the cam that is urged against the cam surface. A relative rotation between front and rear barrels causes the slidably-contacted surface of the cam to slidably contact the cam surface and one of the cams to be restrained by the restraining portion, thus a point of the writing shaft coupled to the slider provided with the cam selectively projects from the point aperture of the barrel.

17 Claims, 10 Drawing Sheets

COMPOSITE WRITING UTENSIL

BACKGROUND OF THE INVENTION

1. Field of the Invention

The present invention relates to a composite writing utensil which houses any plural writing shafts such as, for example, a ballpoint pen writing shaft, a mechanical pencil writing shaft, an eraser writing shaft, and a writing shaft for computer input, and in which a point of one writing shaft of the plural writing shafts can selectively be projected from a point aperture of a barrel, and more particularly to a composite writing utensil which is small in the outer diameter of the barrel.

2. Description of the Related Art

Conventionally, a composite writing utensil of this type is typically required to house a plurality of writing shafts and a mechanism for selectively projecting one of them within a barrel, and consequently has the barrel which is large in its size and diameter.

In contrast, composite writing utensils which are small in diameter are described in Japanese Utility Model Laid-Open Nos. 61-140887 and 55-47362.

In the structure described in the Japanese Utility Model Laid-Open No. 61-140887, a knock rod coupled to a rear end portion of each writing shaft is movable along a window hole formed in the rear portion of the writing shaft, and any writing shaft can selectively be used by advancing a knock rod coupled to the rear end portion of a writing shaft to be projected along the window hole. During the operation, the knock rod and the writing shaft move substantially linearly along the axial direction of the barrel.

Also, in the structure described in the Japanese Utility Model Laid-Open No. 55-47362, a slider is provided within the barrel, a swinging pendulum is coupled to the slider, and further, the slider is provided with a projection pin so as to project in the radial direction. Urging a rear-end knock button makes the slider advance, the projection pin of the slider engage with a return button provided on a clip, and a tip of the swinging pendulum engage with any writing shaft which is located in the lowest position among the plurality of writing shafts by gravity so that the lowest writing shaft can selectively be used. When the writing shaft which has projected is retracted, the engagement with the projection pin is disengaged by depressing the return button provided on the clip, and the writing shaft returns to its original state by a biasing force by the spring. During the operation, the writing shaft moves substantially linearly along the axial direction of the barrel.

In either structure described in the above-described official gazettes, the writing shaft moves substantially linearly along the axial direction of the barrel, however, the circumferential position of each writing shaft basically does not change.

In the structure described in the Japanese Utility Model Laid-Open No. 61-140887, however, since a plurality of knock rods are exposed from the window holes, a problem is that a lot of parts projecting from the barrel deteriorate the appearance of the writing utensil.

In the structure described in the Japanese Utility Model Laid-Open No. 55-47362, a problem is that since it is necessary to operate the return button and entirely change a position of the barrel held by hand in order to switch the writing shaft to be projected, it is troublesome to operate and it is difficult to understand the operation.

SUMMARY OF THE INVENTION

In view of the foregoing and other drawbacks, disadvantages and problems of the conventional methods and structures, a first object of the present invention is to provide a composite writing utensil excellent in appearance, in which an outer diameter of the barrel is small, and its operation is easy.

In order to achieve the above-described object, according to the present invention, a composite writing utensil comprises a barrel for housing a plurality of writing shafts in which a point of one writing shaft of the plurality of writing shafts can selectively be projected from a point aperture of the barrel.

The barrel includes a front barrel and a rear barrel which is rotatable relative to the front barrel, and a minimum outer diameter of the barrel is 10.5 mm or less. A cam body is provided within the barrel so as to be unrotatable with respect to the rear barrel, and a slider unrotatable with respect to the front barrel and coupled to a rear end portion of each writing shaft. The cam body further comprises a V-shaped cam projection for projecting forward, a cam surface for facing forward and extending along the cam projection, and a restraining portion formed in an apex portion of the cam projection of the cam surface. The slider further comprises a V-shaped cam for projecting rearward, and a slidably-contacted surface for facing rearward and extending along the cam. The slidably-contacted surface is urged against the cam surface. A relative rotation between the rear barrel and the front barrel causes the slidably-contacted surface of the cam to slidably contact the cam surface and one of cams to be restrained by the restraining portion, thus a point of the writing shaft coupled to the slider provided with the cam selectively projects from the point aperture of the barrel.

According to the present invention, when the rear barrel is rotated with respect to the front barrel, the relative rotation occurs between the cam body which is unrotatable with respect to the rear barrel, and the slider which is unrotatable with respect to the front barrel, a slidably-contacted surface of the cam of the slider slidably moves along the cam surface of the cam body, and the cam of a slider is restrained by a restraining portion formed in the apex portion of the V shaped cam projection of the cam surface. Thereby, the writing shaft coupled to the slider maintains an advanced state, and its point projects from the point aperture of the barrel to be used. Since the minimum outer diameter of the barrel is 10.5 mm or less, it is possible to obtain a composite writing utensil excellent in appearance and with excellent operability without exposing a plurality of knock rods unlike the conventional cases and without the need for the return button and the like in spite of that the outer diameter of the barrel is small.

Preferably, an angle of inclination of the cam surface of other than neighborhood of the apex portion of the cam projection from a line parallel to the axial direction thereof when the cam projection is developed can be set to 1±0.5° larger than an angle of inclination from a line parallel to the axial direction of the slidably-contacted surface of the cam when the cam is developed. Under circumstances where the cam projection of the cam body must be made steep, if inclination of the cam surface of the cam projection of the cam body is made slightly gentler than that of the slidably-contacted surface of the cam of the slider, it is possible to cause the slidably-contacted surface of the cam to more smoothly slidably contact the cam surface rather than the case where an angle of inclination of the cam surface of the cam projection of the cam body is made the same as that of the slidably-contacted surface of the cam of the slider.

Preferably, an angle of inclination of the cam surface from a line parallel to the axial direction thereof in neighborhood of the apex portion of the cam projection when the cam projection is developed can be made larger than that of other than the neighborhood of the apex portion. Under circumstances where the cam projection of the cam body must be made steep, when the cam of the slider moves toward the restraining portion along the cam surface of the cam projection of the cam body, if the angle of inclination of the cam projection in the neighborhood of the apex thereof is made larger and the inclination is made gentler, egress and ingress of the cam into the restraining portion can be made smoother.

Preferably, an angle θ of inclination of the cam surface of other than neighborhood of the apex portion of the cam projection from a line parallel to the axial direction thereof when the cam projection is developed can be within a range of not less than 21.5° and less than 30°. Within the range, the cam can be moved smoothly and the outer diameter of the shaft barrel can be made into a small diameter.

Preferably, the cam surface extends and is continuous from both ends of the V-shaped cam projection along the circumferential direction, and a portion extending along the circumferential direction is formed with a second restraining portion by which the cam can be restrained. Since the cam projection of the cam body is steep, even in a non-use state in which all the writing shafts are housed within the barrel, the slidably-contacted surface of the cam of the slider coupled to any of the writing shafts slidably has a fear to move along the cam surface of the cam projection of the cam body toward the restraining portion so that the point of the writing shaft would accidentally project possibly. In a non-use state in which all the writing shafts are housed within the barrel, the second restraining portion restrains the cam of one of the sliders, whereby the movement of the slider during the non-use can be hindered.

Further preferably, a restraining force of the cam due to the second restraining portion can be smaller than the restraining force of the cam due to the restraining portion. When the operation is performed in order to use any of the writing shafts from the non-use state in which all the writing shafts are housed within the barrel, the cam can easily come off from the second restraining portion. In contrast, while any of the writing shafts is in use, the cam can be used with stability without the cam easily coming off from the restraining portion.

A number of the plurality of writing shafts can be arbitrarily determined, and can be set to three or more. Writing shafts of three or more can be used by switching in spite of the barrel having a small diameter.

The present disclosure relates to subject matter contained in Japanese Patent Applications Nos. 2003-383088, filed on Nov. 12, 2003 and 2004-14798, filed on Jan. 22, 2004, which are expressly incorporated herein by reference in its entirety.

BRIEF DESCRIPTION OF THE DRAWINGS

The foregoing and other purposes, aspects and advantages will be better understood from the following detailed description of preferred embodiments of the invention with reference to the drawings, in which:

FIG. 2 is an explanatory view representing relationship between a cam body, the guide barrel, a slider and a front barrel in a state in which one writing shaft projects.

FIG. 3 is an explanatory view representing relationship between the cam body, the guide barrel, the slider and the front barrel in a state in which all writing shafts have been retracted.

FIG. 5 is a view representing relationship between the cam body and the cam.

FIG. 9 is a view representing relationship between the cam body and the cam according to the second embodiment.

DETAILED DESCRIPTION OF THE PREFERRED EMBODIMENTS

Hereinafter, with reference to the drawings, the description will be made of embodiments of the present invention. FIGS. 1 to 5 are views showing a composite writing utensil according to the first embodiment of the present invention. In these figures, the composite writing utensil 10 has a barrel 12. The barrel 12 is comprised of a front barrel 14 and a rear barrel 16.

Figure 1:
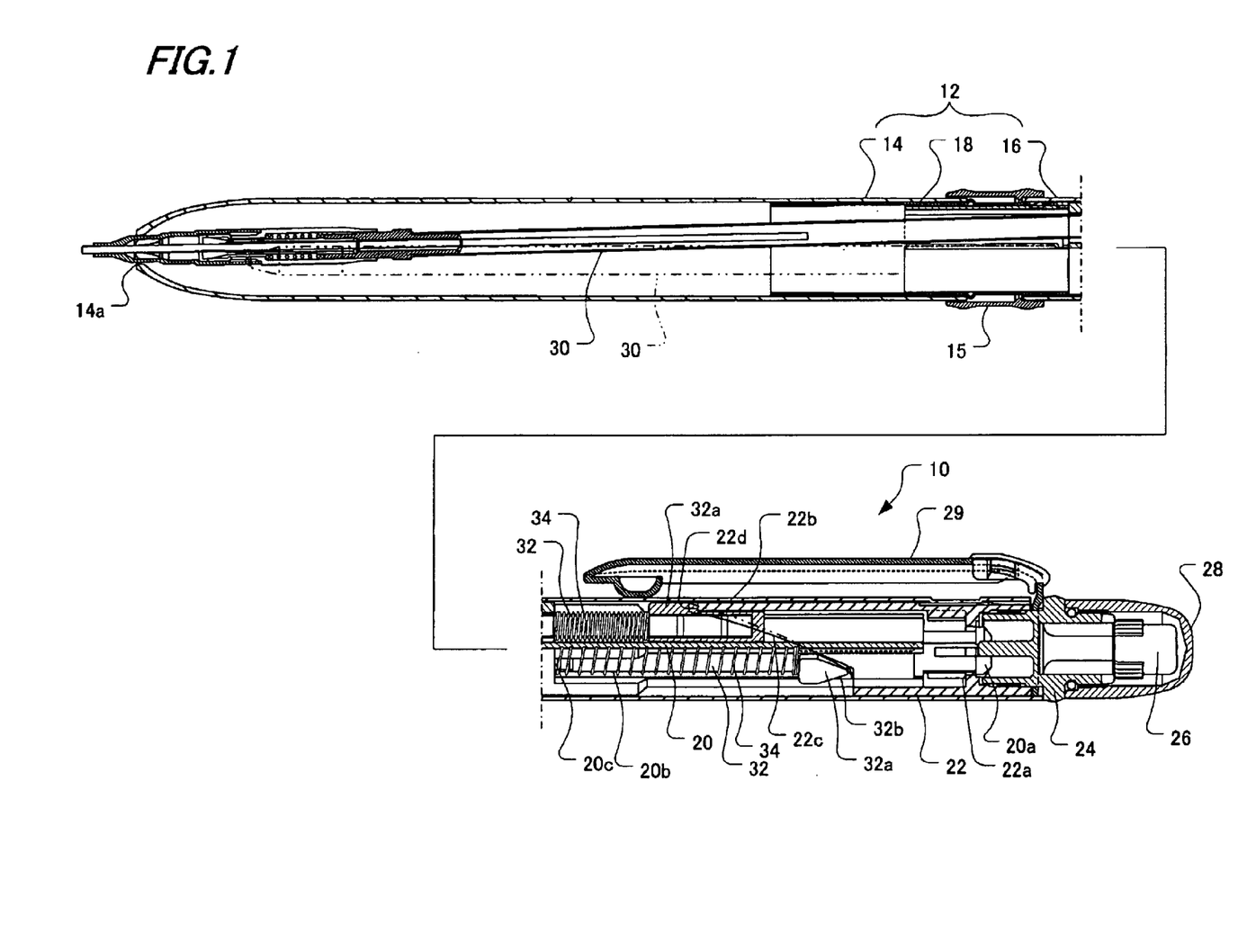
FIG. 1 is a longitudinal sectional view showing a composite writing utensil according to a first embodiment of the present invention (wherein an upper portion of a rear portion of a guide barrel is only sectioned)
Figure 2A:
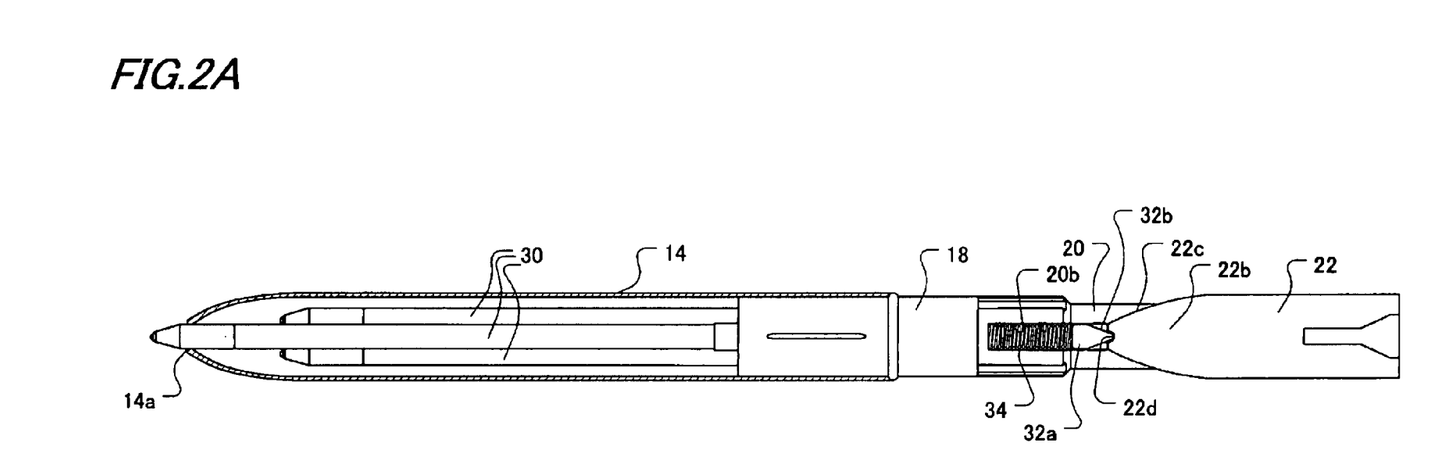
FIG. 2A is a view when viewed from a cam projection side of the cam body.
Figure 2B:
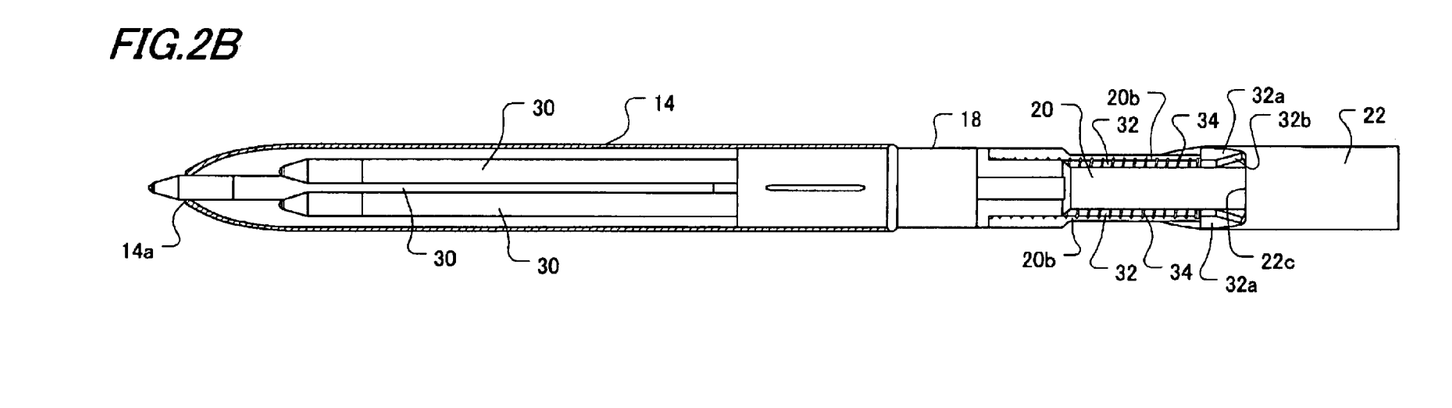
FIG. 2B is a view when viewed from the opposite side of the FIG. 2A.
Figure 3A:
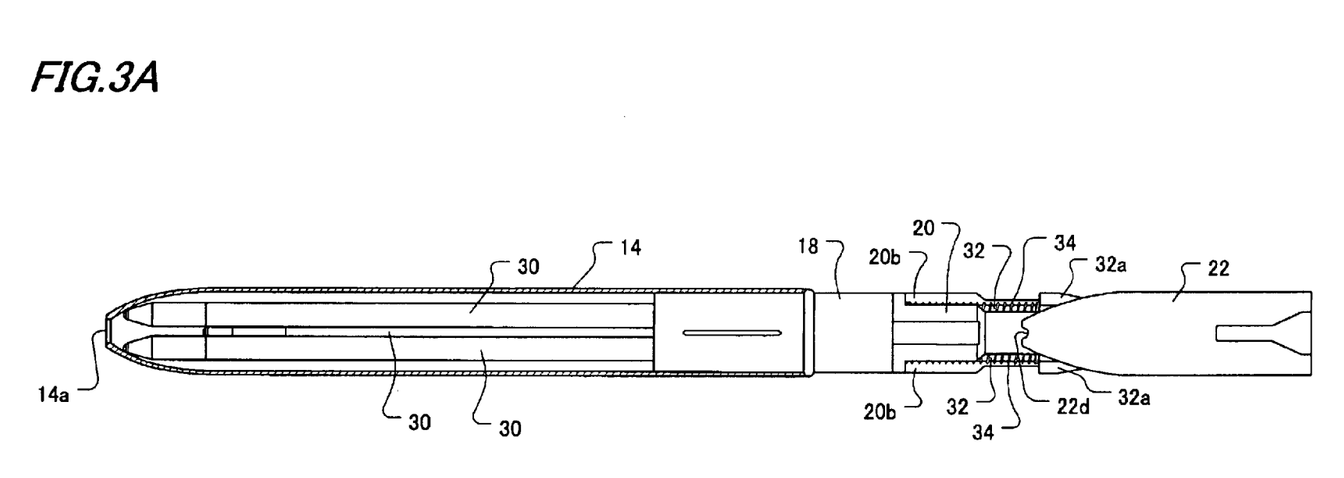
FIG. 3A is a view when viewed from a cam projection side of the cam body.
Figure 3B:
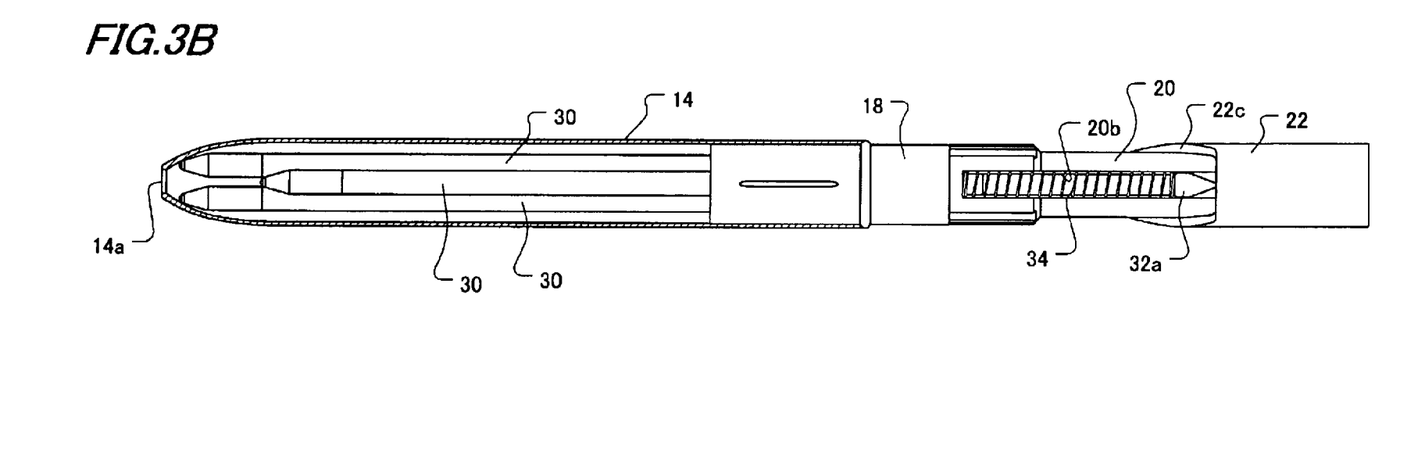
FIG. 3B is a view when viewed from the opposite side of the FIG. 3A.

Outer diameters of the front barrel 14 and the rear barrel 16 are of small diameters at which the present invention is aimed, and their outer diameters are 10.5 mm or less. In order to secure the inner diameter to be at least 7.8 mm for housing a plurality of writing shafts 30, it is necessary to make the wall thickness thin. To this end, the front barrel 14 and the rear barrel 16 are preferably made of metallic material such as, for example, brass or aluminum. In the case of brass, preferable wall thickness is about 0.3 mm to 0.4 mm, in the case of aluminum, preferable wall thickness is about 0.4 mm to 0.5 mm, and the barrel 12 having an outer diameter of less than 9 mm can be realized. Furthermore, when at least one of the front barrel 14 and the rear barrel 16 is made of plastic material, preferable wall thickness thereof is about 0.8 mm to 1.3 mm. A designed decorative ring 15 is fixed at the front end of the rear barrel 16, and although the decorative ring 15 has a larger diameter than the outer diameter of the barrel 12, the minimum outer diameter of the barrel 12 for housing the writing shaft 30 is at least a small diameter less than 10.5 mm.

Within the barrel 12 comprised of the front barrel 14 and the rear barrel 16, a plurality of (in this example, three) writing shafts 30, 30, 30 are housed. In this example, one of the writing shaft 30 is a mechanical pencil writing shaft, and the remaining two writing shafts 30 are ballpoint pen writing shafts with different colors. The present invention is not limited thereto, but any writing shafts including an eraser writing shaft and a writing shaft for computer input can be combined to be used.

A point aperture 14a of the front barrel 14 becomes a point aperture of the barrel 12, and from this point aperture 14a, any of the points of the plurality of writing shafts 30, 30, 30 selectively projects.

The front barrel 14 and the rear barrel 16 are coupled via a fitting barrel 18 so as to be detachable and be relatively rotatable with each other. The fitting barrel 18 is caulk-combined with a guide barrel 20, which is rotatively arranged with respect to the rear barrel 16 within the rear barrel 16. The fitting barrel 18 projects from the front end of the rear barrel 16, and the front barrel 14 is detachably fitted to this projecting portion of the fitting barrel 18. On the projecting portion of the fitting barrel 18 which projects from the front end of the rear barrel 16, fitting ridges are appropriately formed to enhance the fitting force in such a manner that when the front barrel 14 is coupled to the fitting barrel 18, both are adapted to integrally rotate.

A cam body 22 is fixed within the rear barrel 16. A restraining collar 20a at the rear end of the guide barrel 20 is engaged with an internal stepped portion 22a of the cam body 22 so that the guide barrel 20 is adapted to be able to relatively rotate within the rear barrel 16.

The guide barrel 20 is formed with guide grooves 20b extending in the axial direction correspondingly to each writing shaft 30, and a slider 32 to be coupled to the writing shaft 30 is slidably arranged in the corresponding guide groove 20b. A spring 34 inserted between the slider 32 and a partition portion 20c provided in an intermediate portion of the guide barrel 20 is wound around the writing shaft 30 to always bias the slider 32 backward.

The cam body 22 is formed with a cam projection 22b projecting toward the front, an end surface 22c as a cam surface facing forwardly along the cam projection 22b extends in a V-shape, and the end surface 22c further continuously extends from both ends of the cam projection 22b in a circumferential direction. On a V-shaped apex portion of the end surface 22c, a restraining concave portion 22d as a restraining portion is formed.

A V-shaped opening angle 2θ of the end surface 22c of the cam projection 22b extending in a V shape along this cam projection 22b is not less than 43° and less than 60° in a developed state, in other words, an angle θ of inclination from a line parallel to the axial direction is not less than 21.5° and less than 30°, and is smaller than an angle of inclination of the cam projection in the case of a conventional barrel having a large diameter. In other words, the V shape of the cam projection 22b is steeper than prior art. Preferably, the angle of inclination is about θ=23° (2θ=46°). In this respect, in this specification and the claims, the angle of inclination is defined to be an angle from a line parallel to the axial direction. As the inclination closes to be parallel to the axial direction, the inclination will be steeper. Thus, it should be noted that as the angle of inclination is smaller, the inclination becomes steeper whereas as the angle of inclination is larger, the inclination becomes gentler.

Figure 4:
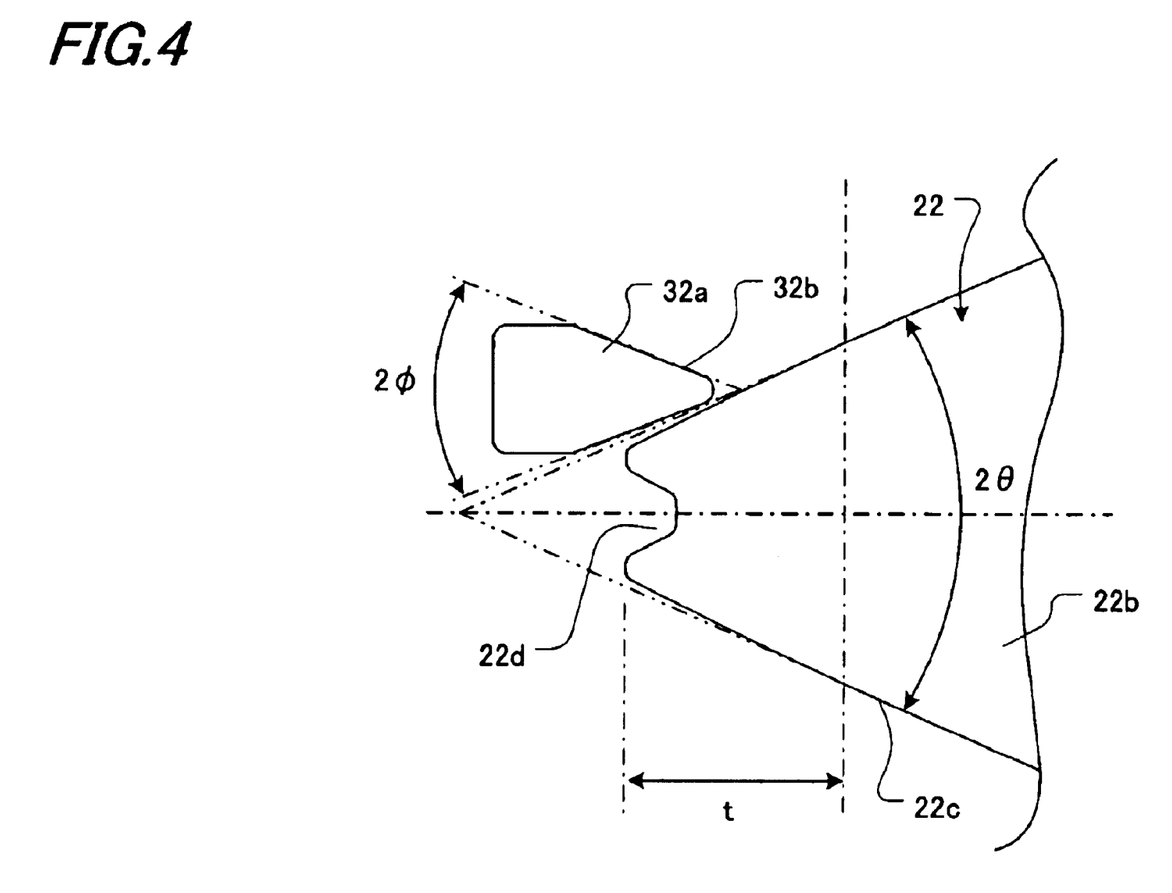
FIG. 4 is an enlarged development representing relationship between neighborhood of the apex of the cam projection of the cam body and a cam of the slider.

Furthermore, as shown in FIG. 4, the end surface 22c within a range of a predetermined distance t from the point in neighborhood of the apex portion of the cam projection 22b of the cam body 22 extends inwardly of the V-shaped line, in more details, the point portion of the cam projection 22b of the cam body 22 draws a circular arc having a large curvature radius, and as a result, the angle of inclination of the end surface 22c located within a range of the predetermined distance t is larger than the angle of inclination of the end surface 22c of the cam projection 22b located outside the range of the predetermined distance t, and the inclination is gentle.

On the other hand, a cam 32a is formed on the outer peripheral surface of the slider 32, and a slidably-contacted surface 32b facing toward the rear extends in a V shape along the cam 32a. The slidably-contacted surface 32b of the cam 32a of the slider 32 to be biased toward the rear by the spring 34 is urged against the end surface 22c, and is slidably contacted with the end surface 22c. An angle φ of inclination from a line parallel to the axial direction of the V-shaped slidably-contacted surface 32b of the cam 32a is made to have the same angle as an angle of inclination of the end surface 22c of the cam projection 22b in a practical manner. In contrast, in the present invention, the angle θ of inclination of the cam projection 22b not at the same angle as the angle φ, but is 1±0.5° larger than the angle φ of inclination of the cam 32a of the slider 32 in a developed state, in other words, the inclination of the cam 32a of the slider 32 is steeper than the angle of inclination of the cam projection 22b of the cam body 22. For example, when a V opening of the cam projection 22b of the cam body 22 is assumed to be 2θ=46°, the V opening of the cam 32a of the slider 32 is 2φ=44°.

An eraser bearer 24 is fixed behind the cam body 22, an eraser 26 is inserted into the eraser bearer 24, and is covered with an eraser cover 28. Also, a base portion of a clip 29 is mounted between the eraser bearer 24 and the rear end of the rear barrel 16, and a body of the clip 29 extends along the rear barrel 16.

Figure 6:
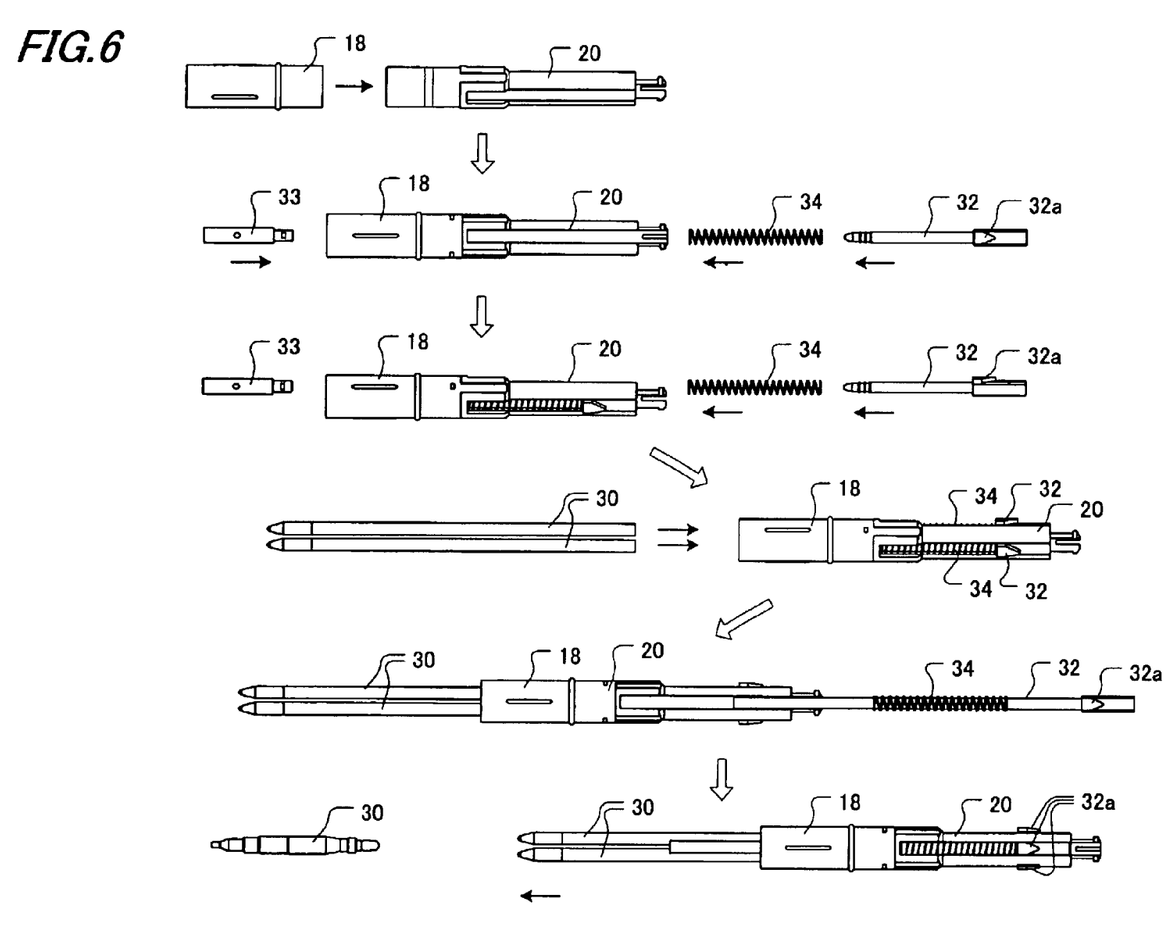
FIG. 6 is an explanatory view representing an assembly procedure for the composite writing utensil according to the present invention.
Figure 7:
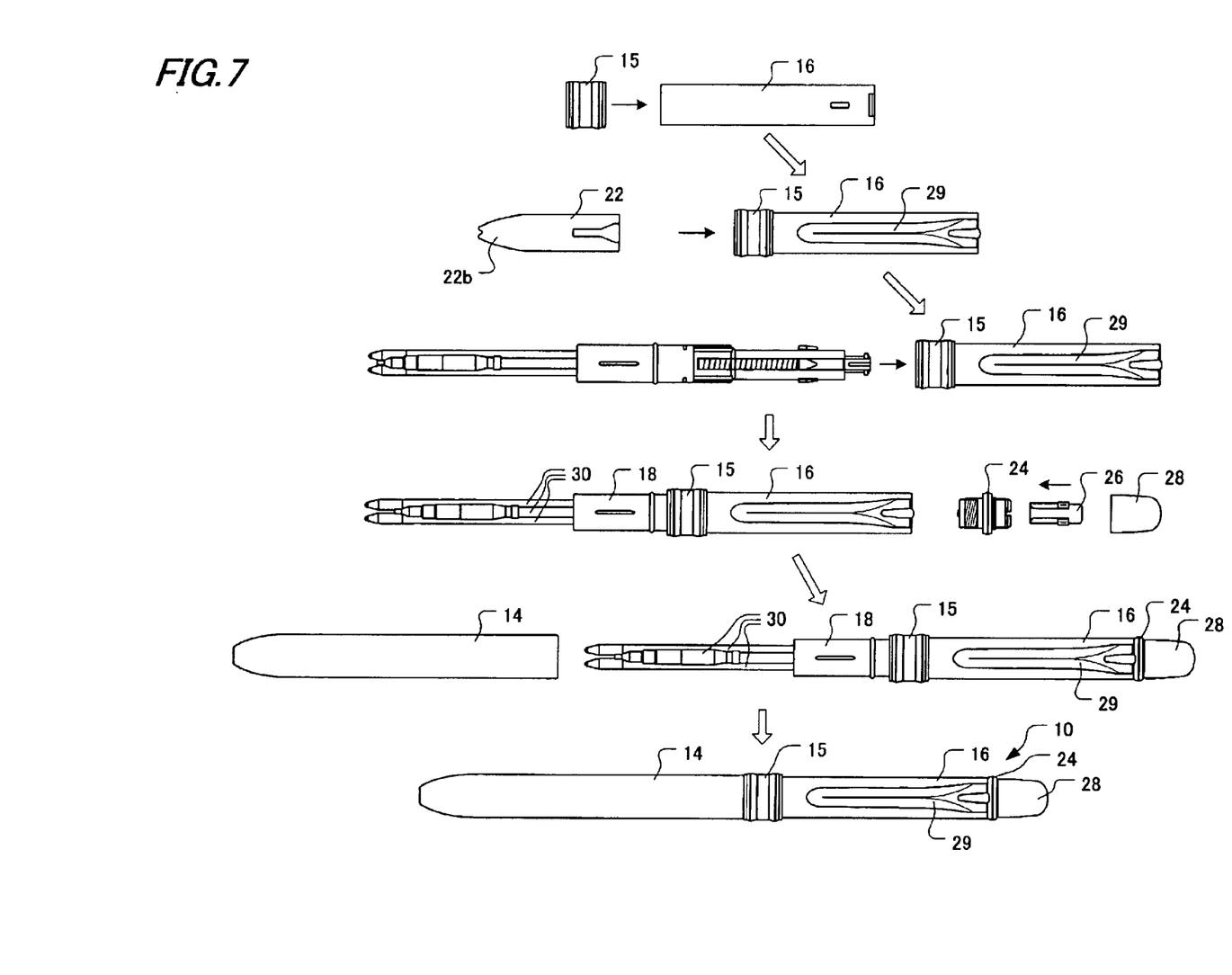
FIG. 7 is an explanatory view as a follow-up to FIG. 6.

FIGS. 6 and 7 are views showing an assembly procedure of the compound writing utensil 10. In brief, as shown first in FIG. 6, the fitting barrel 18 is caulk-combined with the guide barrel 20, subsequently, the slider 32 and the spring 34 are inserted into the guide groove 20b from behind the guide barrel 20; and a rear end portion of the writing shaft 30 is coupled to the slider 32 via a fitting 33 to manufacture an unit. On the other hand, after the decorative ring 15 is fixed and the clip 29 is installed to the rear barrel 16 as shown in FIG. 7, the cam body 22 is fixed within the rear barrel 16. Thus, the unit of FIG. 6 including the guide barrel 20 is inserted from ahead of the rear barrel 16, the restraining collar 20a of the guide barrel 20 is engaged to the internal stepped portion 22a of the cam body 22, the eraser bearer 24, the eraser 26 and the eraser cover 28 are installed to the rear end of the rear barrel 16, and finally the front barrel 14 is mounted to the fitting barrel 15 to complete the composite writing utensil 10.

The description will be made of an operation of the composite writing utensil 10 to be constructed as described above.

Figures 5A, 5B:
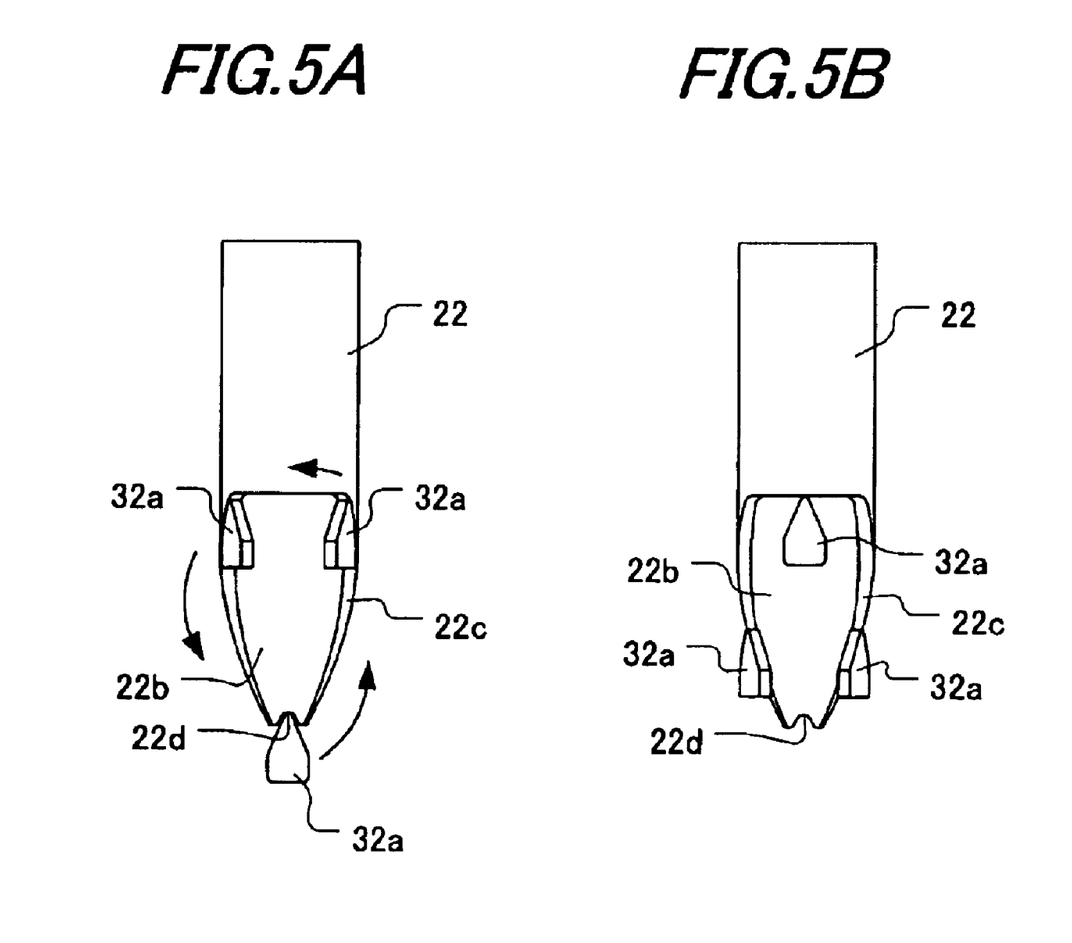
FIG. 5A shows a state in which one writing shaft has projected.
FIG. 5B shows a state in which all writing shafts have been retracted.

When the rear barrel 16 is rotated with respect to the front barrel 14 from the state shown in FIGS. 3 and 5B, the cam body 22 fixed to the rear barrel 16 rotates together. On the other hand, since the fitting barrel 18 which is adapted to rotate integrally with the front barrel 14 and the guide barrel 20 coupled to the fitting barrel 18 do not rotate, a relative rotation occurs between the guide barrel 20 and the cam body 22. Accordingly, a relative rotation occurs between the slider 32 located in the guide groove 20b of the guide barrel 20 and the cam body 22 so that the slidably-contacted surface 32b of the cam 32a of the slider 32 moves along the end surface 22c of the cam body 22. Thus, when the cam 32a of one slider 32 reaches a restraining concave portion 22d on the end surface 22c of the cam projection 22b of the cam body 22 to be restrained by the restraining concave portion 22d, the slider 32 and the writing shaft 30 to be coupled thereto maintain the advanced state, the point of the writing shaft 30 projects from the point aperture 14a of the front barrel 14 to be used (FIGS. 2 and 5A).

The cams 32a of the other sliders 32 reach a foot portion of the cam projection 22b of the end surface 22c of the cam body 22, and the slider 32 and the writing shaft 30 to be coupled thereto maintain a retracted state.

In a case where the use of the writing shaft 30 which is projecting is completed and it should be housed, when the rear barrel 16 is rotated a little strongly with respect to the front barrel 14 again, the cam 32a of the slider 32 which is restrained by the restraining concave portion 22d of the cam projection 22b of the cam body 22 gets out of the restraining concave portion 22d to move along the end surface 22c and transit to such a state shown in FIGS. 3 and 5B. Then, all the writing shafts 30 enter a retracted state. As described above, the plurality of writing shafts 30 rotate and move along the circumferential direction of the barrel 12 within the barrel 12, whereby a state in which one writing shaft 30 projects from the point of the barrel 12, and a state in which all the writing shafts 30 are retracted can be repeatedly changed in order. In a case where the outer diameter and the inner diameter of the barrel 12 are small, in order to cause the barrel 12 to rotate and move smoothly along the circumferential direction thereof, it is necessary and indispensable to cause sliding between the end surface 22c of the cam projection 22b of the cam body 22 and the slidably-contacted surface 32b of the cam 32a of the slider 32 to occur smoothly. Further, since the barrel 12 is of a small diameter, the angle of inclination from a line parallel to the axial direction of the end surface 22c of the cam projection 22b of the cam body 22 must be made small, that is, the inclination must be made steep.

According to the inventor's research, under circumstances where the end surface 22c of the cam projection 22b of the cam body 22 must be made steep as described above, it turned out that the slider 32 moves smoothly when the inclination of the end surface 22c of the cam projection 22b of the cam body 22 is made slightly gentler than that of the slidably-contacted surface 32b of the cam 32a of the slider 32 rather than when an angle of inclination of the end surface 22c of the cam projection 22b of the cam body 22 is made the same as that of the slidably-contacted surface 32b of the cam 32a of the slider 32. It has also turned out that as a difference in angle of inclination, it can be set to 1±0.5° and as a difference in V opening angle, it can be set to 2±1°. Further, not only the foregoing, but also it has turned out that when the angle of inclination of the end surface 22c is large in the apex portion of the cam projection 22b of the cam body 22, egress and ingress of the cam 32a of the slider 32 to the restraining concave portion 22d becomes smooth.

While the barrel 12 is of a small diameter, a composite writing utensil having three writing shafts 30 is capable of projecting and retracting the point of the writing shaft 30 smoothly. Also, since the operation is performed by relative rotation between the rear barrel 16 and the front barrel 14, there is no need for a knock rod which is exposed from the conventional barrel, and the like, further there is no need for the return button and the like, and a composite writing utensil good in appearance and having good operability can be obtained.

Figure 8:
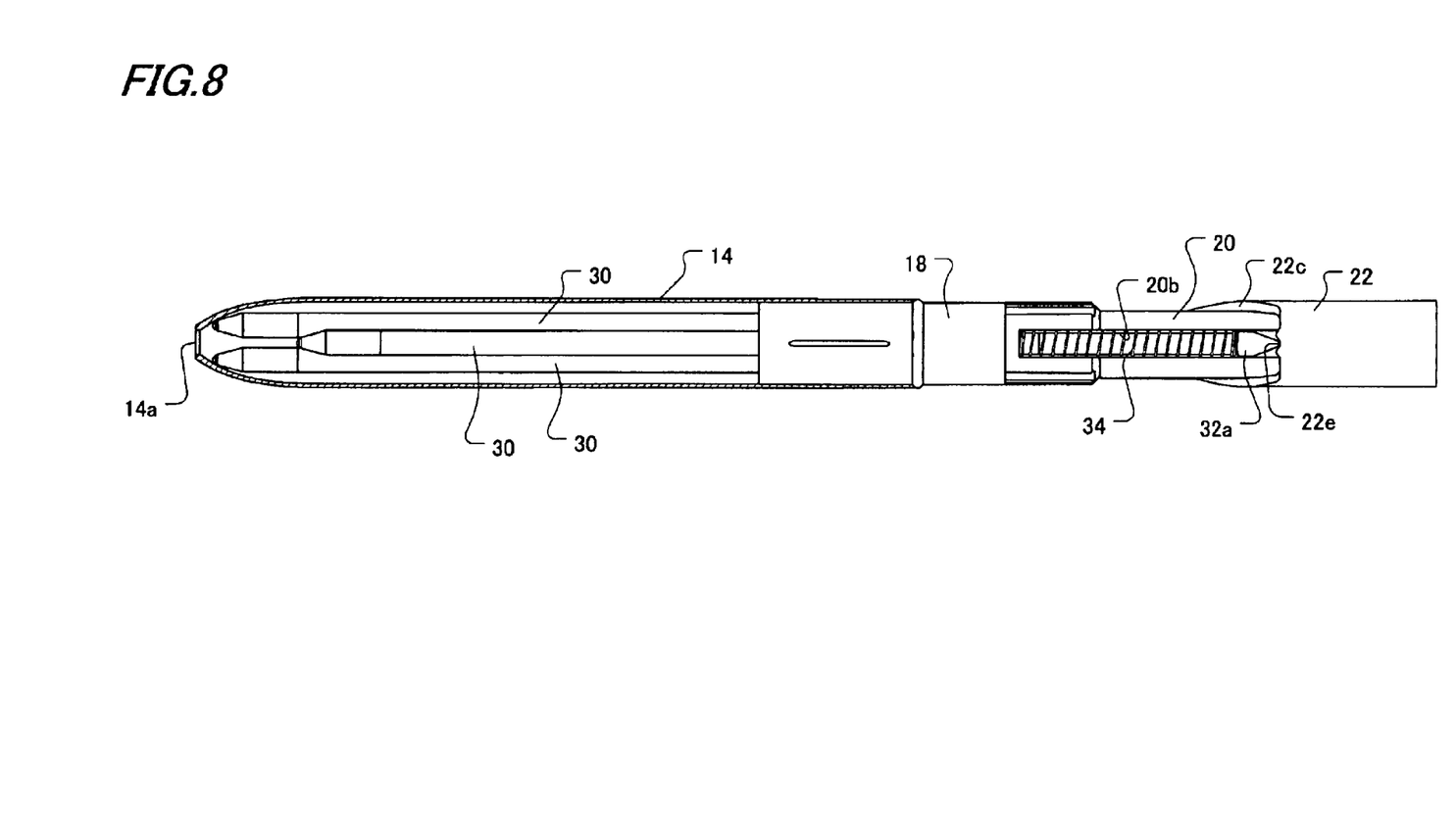
FIG. 8 is a view representing a composite writing utensil according to a second embodiment of the present invention, corresponding to FIG. 3B.
Figure 9A:
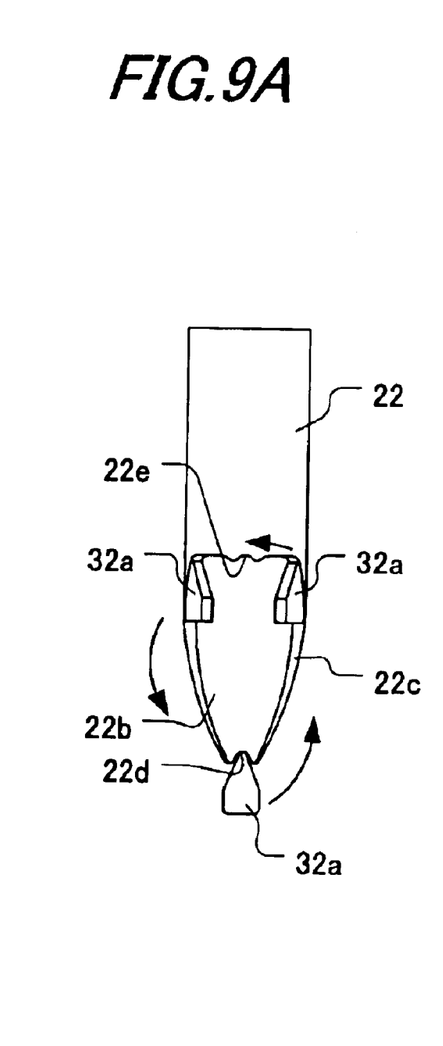
FIG. 9A shows a state in which one writing shaft has projected.

FIGS. 8 and 9 are views showing a composite writing utensil according to a second embodiment of the present invention. This embodiment is different from the first embodiment in that second restraining concave portion 22e as a second restraining portion is formed in a portion in which the end surface 22c extends in the circumferential direction opposite side to the portion in which a V-shaped cam projection 22b of the cam body 22 is formed. Depth of this second restraining concave portion 22e is shallower than that of the restraining concave portion 22d.

Figure 9B:
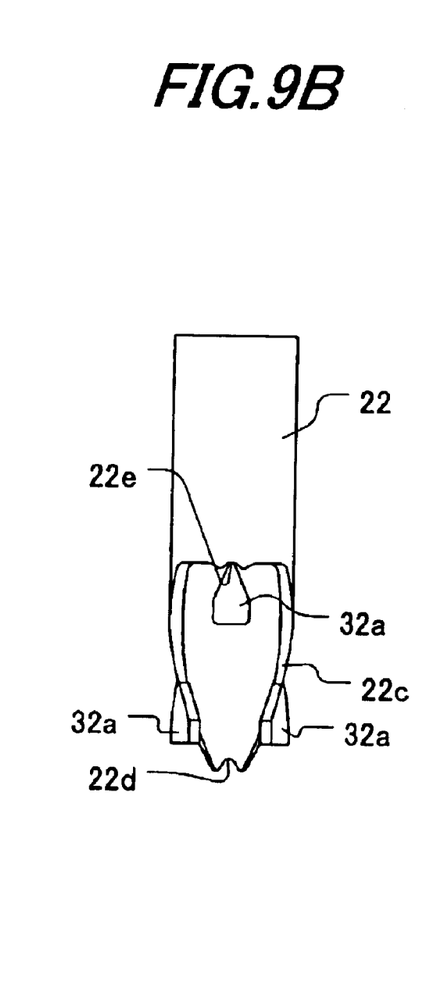
FIG. 9B shows a state in which all writing shafts have been retracted.

The description will be made of an operation of this embodiment. The state in which one writing shaft 30 is in an advance state, and the cam 32a of the slider 32 coupled to the writing shaft 30 is restrained by the restraining concave portion 22d is the same as that of the first embodiment. When the rear barrel 16 is rotated with respect to the front barrel 14 from this state, and the cam 32a of the slider 32 gets out of the restraining concave portion 22d to transit to such a state shown in FIG. 9A, the cam 32a of another slider 32 is restrained by the second restraining concave portion 22e. In this state, all the writing shafts 30 are in a retracted state, and further one slider 32 is restrained by the second restraining concave portion 22e (FIG. 9B). Thereby, since unintended movement of the slider 32 is hindered, the retracted state can be reliably maintained. In a case where the end surface 22c of the cam projection 22b is steep particularly like this example, even when the writing shaft 30 is in the retracted state, the slidably-contacted surface 32b of the cam 32a of the slider 32 coupled to any of the writing shafts 30 slides along the end surface 22c of the cam projection 22b of the cam body 22 toward the restraining concave portion 22d to possibly project the point of the writing shaft 30 accidentally, Such unintended movement of the slider 32 can be hindered.

Also, on performing the retracting operation, the user can obtain a click feeling that the cam 32a of one slider 32 is restrained by the second restraining concave portion 22e, and can reliably know that it could be housed.

Figure 10:
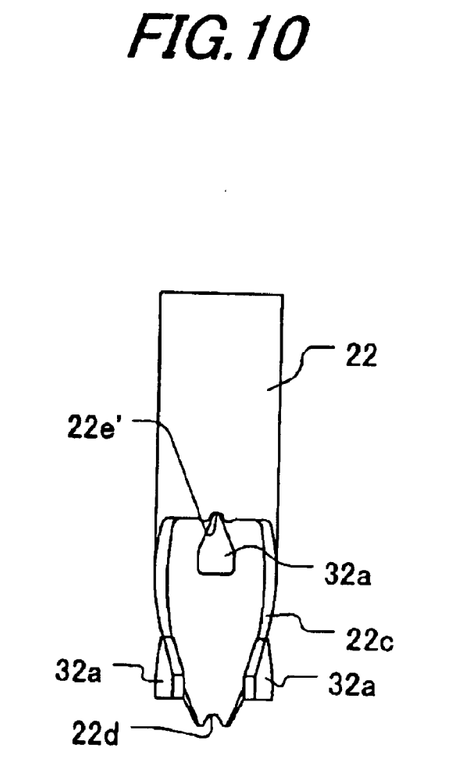
FIG. 10 is an equivalent view to FIG. 9B, representing another example of a second restraining concave portion.
Figure 11:
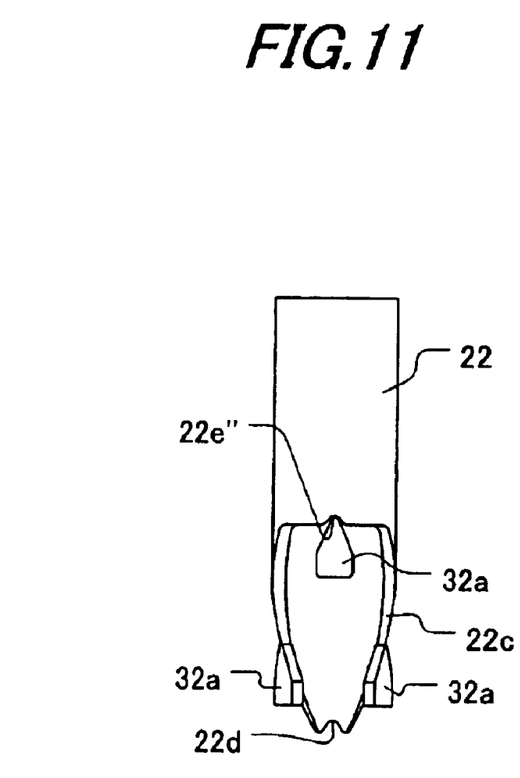
FIG. 11 is an equivalent view to FIG. 9B, representing still another example of the second restraining concave portion.

In this respect, since the second restraining concave portion 22e is shallower in depth of the concave portion than the restraining concave portion 22d and has a smaller restraining force, it is capable of performing an operation for releasing the restraint by the second restraining concave portion 22e with a small force simply and advancing either writing shaft 30, and the operability is excellent. As a shape of the second restraining concave portion, such second restraining concave portion 22e', 22e'' as shown in FIG. 10 or 11 can be adopted.

While the invention has been described in terms of several preferred embodiments, those skilled in the art will recognize that the invention can be practiced with modification within the spirit and scope of the appended claims.

What is claimed is:

1. A composite writing utensil comprising a barrel for housing a plurality of writing shafts in which a point of one writing shaft of said plurality of writing shafts can selectively be projected from a point aperture of said barrel, wherein said barrel includes a front barrel and a rear barrel which is rotatable relative to said front barrel, said composite writing utensil comprises:

a cam body provided within said barrel, said cam body being unrotatable with respect to said rear barrel; and a slider unrotatable with respect to said front barrel and coupled to a rear end portion of each writing shaft, said cam body further comprises a V-shaped cam projection for projecting forward, a cam surface for facing forward and extending along the cam projection, and a restraining portion formed in an apex portion of the cam projection of said cam surface, said slider further comprises a V-shaped cam for projecting rearward, and a slidably-contacted surface for facing rearward and extending along said cam, said slidably-contacted surface being urged against said cam surface, wherein a relative rotation between said rear barrel and said front barrel causes said slidably-contacted surface of said cam to slidably-contact the cam surface and said cam to be restrained by said restraining portion, whereby a point of the writing shaft coupled to the slider provided with said cam selectively projects from the point aperture of said barrel; and an angle of inclination of said cam surface of other than a neighborhood of an apex portion of said cam projection from a line parallel to an axial direction thereof when said cam projection is developed is 1±0.5° larger than an angle of inclination of the slidably-contacted surface of said cam from a line parallel to the axial direction thereof when said cam is developed.

2. The composite writing utensil according to claim 1, wherein a minimum outer diameter of said barrel is one of equal to or less than 10.5 mm.

3. The composite writing utensil according to claim 2, wherein an angle θ of inclination of said cam surface of other than neighborhood of the apex portion of said cam projection from a line parallel to the axial direction thereof when said cam projection is developed is within a range of not less than 21.5° and less than 30°.

4. The composite writing utensil according to claim 2, wherein the cam surface of said cam body extends and is continuous from both ends of a V-shaped cam projection along a circumferential direction, and a portion extending along the circumferential direction is formed with a second restraining portion by which said cam can be restrained.

5. The composite writing utensil according to claim 2, wherein said plurality of writing shafts are three or more.

6. The composite writing utensil according to claim 1, wherein an angle of inclination of the cam surface, from a line parallel to the axial direction thereof, in neighborhood of the apex portion of said cam projection when said cam projection is developed is larger than that of other than the neighborhood of the apex portion.

7. The composite writing utensil according to claim 6, wherein an angle θ of inclination of said cam surface of other than neighborhood of the apex portion of said cam projection from a line parallel to the axial direction thereof when said cam projection is developed is within a range of not less than 21.5° and less than 30°.

8. The composite writing utensil according to claim 6, wherein the cain surface of said cam body extends and is continuous from both ends of a V-shaped cam projection along a circumferential direction, and a portion extending along the circumferential direction is formed with a second restraining portion by which said cam can be restrained.

9. The composite writing utensil according to claim 6, wherein said plurality of writing shafts are three or more.

10. The composite writing utensil according to claim 1, wherein an angle θ of inclination of said cam surface of other than neighborhood of the apex portion of said cam projection from a line parallel to the axial direction thereof when said cam projection is developed is within a range of not less than 21.5° and less than 30°.

11. The composite writing utensil according to claim 10, wherein the cam surface of said cam body extends and is continuous from both ends of a V-shaped cam projection along a circumferential direction, and a portion extending along the circumferential direction is formed with a second restraining portion by which said cam can be restrained.

12. The composite writing utensil according to claim 10, wherein said plurality of writing shafts are three or more.

13. The composite writing utensil according to claim 1, wherein the cam surface of said cam body extends and is continuous from both ends of a V-shaped cam projection along a circumferential direction, and a portion extending along the circumferential direction is formed with a second restraining portion by which said cam can be restrained.

14. The composite writing utensil according to claim 13, wherein a restraining force of the cam due to said second restraining portion is smaller than the restraining force of the cam due to said restraining portion.

15. The composite writing utensil according to claim 14, wherein said plurality of writing shafts are three or more.

16. The composite writing utensil according to claim 13, wherein said plurality of writing shafts are three or more.

17. The composite writing utensil according to claim 1, wherein said plurality of writing shafts are three or more.

* * * * *